United States Patent
Gu et al.

(10) Patent No.: US 11,881,769 B2
(45) Date of Patent: Jan. 23, 2024

(54) MULTI-LEVEL CONVERTER CONTROL METHOD

(71) Applicant: THE 13TH RESEARCH INSTITUTE OF CHINA ELECTRONICS TECHNOLOGY GROUP CORPORATION, Shijiazhuang (CN)

(72) Inventors: Zhanbiao Gu, Shijiazhuang (CN); Zhiliang Zhang, Shijiazhuang (CN); Shipeng Cheng, Shijiazhuang (CN); Xiaoyong Ren, Shijiazhuang (CN); Senfeng Xu, Shijiazhuang (CN); Chao Tan, Shijiazhuang (CN)

(73) Assignee: The 13th Research Institute of China Electronics Technology Group Corporation, Hebei (CN)

( * ) Notice: Subject to any disclaimer, the term of this patent is extended or adjusted under 35 U.S.C. 154(b) by 275 days.

(21) Appl. No.: 17/526,901

(22) Filed: Nov. 15, 2021

(65) Prior Publication Data
US 2022/0123651 A1    Apr. 21, 2022

Related U.S. Application Data

(63) Continuation of application No. PCT/CN2021/096055, filed on May 26, 2021.

(30) Foreign Application Priority Data

Oct. 21, 2020   (CN) .......................... 202011134919.1

(51) Int. Cl.
H02M 3/158     (2006.01)
H02M 1/14      (2006.01)
(Continued)

(52) U.S. Cl.
CPC ............... *H02M 3/07* (2013.01); *H02M 1/14* (2013.01); *H02M 1/38* (2013.01)

(58) Field of Classification Search
CPC ............ H02M 1/14; H02M 1/38; H02M 3/07; H02M 3/158
See application file for complete search history.

(56) References Cited

U.S. PATENT DOCUMENTS

| | | |
|---|---|---|
| 10,199,822 B2 | 2/2019 | Shen et al. |
| 2011/0018511 A1 | 1/2011 | Carpenter et al. |
| | (Continued) | |

FOREIGN PATENT DOCUMENTS

| | | |
|---|---|---|
| CN | 107306083 A | 10/2017 |
| CN | 108712073 A | 10/2018 |

OTHER PUBLICATIONS

Ming, L., et al., "Study on Control Strategy of Paralleled Three-level Buck Converter", Buck TL, Jul. 2017, 4 pages, vol. 37, No. 7, China Academic Journal Electronic Publishing House.

*Primary Examiner* — Gary L Laxton
(74) *Attorney, Agent, or Firm* — AP3 Law Firm, PLLC

(57) ABSTRACT

A multi-level converter control method is provided that includes: acquiring an inductive current of an LC filter in a driving pulse period; determining a to-be-adjusted first switch tube and a first duty ratio adjustment amount of the to-be-adjusted first switch tube based on a slope of a rising period of the inductive current, and adjusting a duty ratio of the to-be-adjusted first switch tube based on the first duty ratio adjustment amount; and determining a to-be-adjusted second switch tube and a second duty ratio adjustment amount of the to-be-adjusted second switch tube based on a slope of a falling period of the inductive current, and adjusting a duty ratio of the to-be-adjusted second switch tube based on the second duty ratio adjustment amount.

10 Claims, 4 Drawing Sheets

(51) Int. Cl.
  *H02M 3/07*    (2006.01)
  *H02M 1/38*    (2007.01)

(56) References Cited

U.S. PATENT DOCUMENTS

2016/0329809 A1\* 11/2016 Granato ................ H02M 3/158
2017/0201177 A1\*  7/2017 Kesarwani ............. H02M 1/14
2019/0379287 A1  12/2019 Zhang et al.
2021/0296983 A1\*  9/2021 Rentmeister ........ H02M 1/0095
2022/0329152 A1\* 10/2022 Li ........................ H02M 3/1582
2022/0376616 A1\* 11/2022 Hu .......................... H02M 3/07

\* cited by examiner

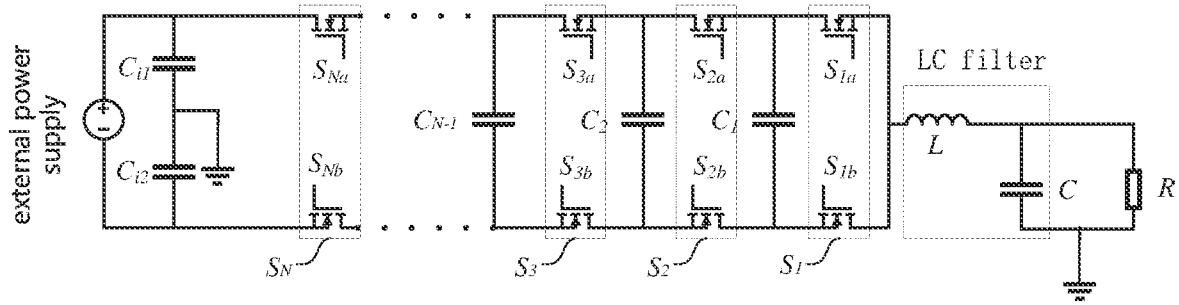

Fig. 1

```
┌──────────────────────────────────────────────────────────────────────────────┐
│ a duty ratio of a drive pulse of each first switch tube and each second switch is set based │ ─ S1001
│        on a preset input voltage and a preset output voltage of the multi-level converter          │
└──────────────────────────────────────────────────────────────────────────────┘
                                          ▼
┌──────────────────────────────────────────────────────────────────────────────┐
│  for the various first switch tubes connected in series, phases of the drive pulses of the         │ ─ S1002
│  various first switch tubes connected in series are sequentially set at a delay interval of        │
│  360°/N from the input end of the LC filter to the positive electrode of the external power        │
│                    supply, where N is the number of switch tube groups                             │
└──────────────────────────────────────────────────────────────────────────────┘
                                          ▼
┌──────────────────────────────────────────────────────────────────────────────┐
│  for any switch tube group, the drive pulse of the first switch tube and the drive pulse of        │ ─ S1003
│  the second switch tube are set to be complementary, and a dead time of the drive pulse            │
│             of the first switch tube and the drive pulse of the second switch tube is set          │
└──────────────────────────────────────────────────────────────────────────────┘
                                          ▼
┌──────────────────────────────────────────────────────────────────────────────┐
│           an inductive current of the LC filter within a drive pulse cycle is collected            │ ─ S101
└──────────────────────────────────────────────────────────────────────────────┘
                                          ▼
┌──────────────────────────────────────────────────────────────────────────────┐
│  a first switch tube to be adjusted and a duty cycle adjustment amount of the first switch         │
│  tube to be adjusted are determined based on a slope of a rising period of the inductive           │ ─ S102
│  current, and a duty cycle of the first switch tube to be adjusted is adjusted based on the        │
│                 duty cycle adjustment amount of the first switch tube to be adjusted               │
└──────────────────────────────────────────────────────────────────────────────┘
                                          ▼
┌──────────────────────────────────────────────────────────────────────────────┐
│    a second switch tube to be adjusted and a duty cycle adjustment amount of the second            │
│    switch tube to be adjusted are determined based on a slope of a falling period of the           │ ─ S103
│    inductive current, and a duty cycle of the second switch tube to be adjusted is adjusted        │
│         based on the duty cycle adjustment amount of the second switch tube to be adjusted         │
└──────────────────────────────────────────────────────────────────────────────┘
```

Fig. 2

MULTI-LEVEL CONVERTER CONTROL METHOD

CROSS-REFERENCE TO RELATED APPLICATIONS

This application is a continuation application of International Application No. PCT/CN2021/096055, filed on May 26, 2021, which claims priority to Chinese Patent Application No. CN 202011134919.1, filed on Oct. 21, 2020. The disclosures of the aforementioned applications are hereby incorporated herein by reference in their entireties.

TECHNICAL FIELD

This application belongs to the technical field of electric power, and particularly relates to a multi-level converter control method.

BACKGROUND

A multi-level converter uses flying capacitors to divide an input voltage equally among switch tubes connected in series and to reduce the pressure of the various switch tubes.

However, since an input power supply is not an ideal voltage source and the delay of a gate drive signal is not consistent, the flying capacitor voltage of the multi-level converter cannot be completely balanced in practical operation. When the flying capacitor voltage deviates from a theoretical value, the stress of the switch tube connected thereto will be increased, and the switch tube may be easily damaged. Meanwhile, a bias voltage also increases an inductive current ripple and reduces the quality of an output voltage. At present, the bias voltage is mainly controlled and adjusted in the prior art by directly detecting the voltage of each flying capacitor, but this method has the disadvantages of difficult floating voltage detection, complex detection circuit when the number of levels is large, etc.

SUMMARY

These and other problems are generally solved or circumvented, and technical advantages are generally achieved, by embodiments of the present disclosure which provide a multi-level converter control method.

TECHNICAL PROBLEMS

The disclosure provides a multi-level converter control method and intends to solve the technical problem that it is difficult to control the flying capacitor voltage balance of a multi-level converter in the prior art.

TECHNICAL SOLUTIONS

An embodiment of this application provides a multi-level converter control method. The method is applied to a multi-level converter including at least two switch tube groups connected in series, a flying capacitor connected in parallel between two adjacent switch tube groups, and an LC filter. Each switch tube group includes a first switch tube and a second switch tube. A first end after series connection of the first switch tubes of the at least two switch tube groups is connected to a positive electrode of an external power supply. A first end after series connection of the second switch tubes of the at least two switch tube groups is connected to a negative electrode of the external power supply. A second end after series connection of the first switch tubes of the at least two switch tube groups and a second end after series connection of the second switch tubes of the at least two switch tube groups are both connected to an input end of the LC filter. An output end of the LC filter is configured to be externally connected to a load. For any one of the flying capacitors connected in parallel between two adjacent switch tube groups that respectively named as a first switch tube group and a second switch tube group, a series connection point formed by the first switch tube of the first switch tube group connected in series with the first switch tube of the second switch tube group is connected to a first end of the flying capacitor, and a series connection point formed by the second switch tube of the first switch tube group connected in series with the second switch tube of the second switch tube group is connected to a second end of the flying capacitor.

The multi-level converter control method includes: collecting an inductive current of the LC filter within a drive pulse cycle; determining a first switch tube to be adjusted and a duty cycle adjustment amount of the first switch tube to be adjusted based on slopes of rising periods of the inductive current, and adjusting a duty cycle of the first switch tube to be adjusted based on the duty cycle adjustment amount of the first switch tube to be adjusted; and determining a second switch tube to be adjusted and a duty cycle adjustment amount of the second switch tube to be adjusted based on slopes of falling periods of the inductive current, and adjusting a duty cycle of the second switch tube to be adjusted based on the duty cycle adjustment amount of the second switch tube to be adjusted.

In one embodiment, the determining a first switch tube to be adjusted and a duty cycle adjustment amount of the first switch tube to be adjusted based on slopes of rising periods of the inductive current includes: calculating slopes of various rising periods of the inductive current and an average value of the slopes of the various rising periods of the inductive current; respectively calculating a difference value between the slope of each rising period and the average value, and determining a maximum difference value; and determining the first switch tube to be adjusted and the duty cycle adjustment amount of the first switch tube to be adjusted based on the maximum difference value.

In one embodiment, the determining the first switch tube to be adjusted based on the maximum difference value includes: determining a rising period corresponding to the maximum difference value; and determining the first switch tube to be adjusted according to a position of the rising period corresponding to the maximum difference value within the drive pulse cycle.

In one embodiment, the determining the duty cycle adjustment amount of the first switch tube to be adjusted based on the maximum difference value includes: inputting the maximum difference value into a preset proportional-integral controller to obtain the duty cycle adjustment amount of the first switch tube to be adjusted.

In one embodiment, before the collecting an inductive current of the LC filter within a drive pulse cycle, the method further includes: setting a duty ratio of a drive pulse of each first switch tube based on a preset input voltage and a preset output voltage of the multi-level converter.

In one embodiment, if a reference ground of the multi-level converter is the negative electrode of the external power supply, the setting a duty ratio of a drive pulse of each first switch tube based on a preset input voltage and a preset output voltage of the multi-level converter includes:

$$D = V_{out} / V_{in}$$

where D is the duty ratio of the drive pulse, Vin is the preset input voltage, and Vout is the preset output voltage.

In one embodiment, if a reference ground of the multi-level converter is an intermediate point of the external power supply, the setting a duty ratio of a drive pulse of each first switch tube based on a preset input voltage and a preset output voltage of the multi-level converter includes:

$$D = V_{out} / V_{in} + 0.5$$

where D is the duty ratio of the drive pulse, Vin is the preset input voltage, and Vout is the preset output voltage.

In one embodiment, before the collecting an inductive current of the LC filter within a drive pulse cycle, the method further includes: sequentially setting, for the various first switch tubes connected in series, phases of the drive pulses of the various first switch tubes connected in series at a delay interval of 360°/N from the input end of the LC filter to the positive electrode of the external power supply, where N is the number of switch tube groups.

In one embodiment, before the collecting an inductive current of the LC filter within a drive pulse cycle, the method further includes: setting, for any one of the switch tube groups, the drive pulse of the first switch tube and the drive pulse of the second switch tube to be complementary.

In one embodiment, before the collecting an inductive current of the LC filter within a drive pulse cycle, the method further includes: setting, for any one of the switch tube groups, a dead time of the drive pulse of the first switch tube and the drive pulse of the second switch tube.

Advantageous Effects of the Disclosure

According to the multi-level converter control method provided by the embodiment of this application, a switch tube to be adjusted and a duty ratio adjustment amount of the switch tube are determined according to slopes of a rising period and a falling period of an inductive current by collecting the inductive current of an LC filter within one drive pulse cycle, and a duty ratio of the switch tube to be adjusted is adjusted according to the duty ratio adjustment amount, thereby changing a voltage of a flying capacitor connected to the switch tube, and finally balancing the voltage of each flying capacitor of the multi-level converter. According to the control method provided by this application, it is only necessary to collect the inductive current of the LC filter to control the voltage of each flying capacitor of the multi-level converter to be balanced, and the implementation method is simple and is not affected by the number of levels of the multi-level converter.

BRIEF DESCRIPTION OF THE DRAWINGS

In order to more clearly illustrate the technical solutions in the embodiments of this application, the accompanying drawings to be used in the descriptions of the embodiments or the prior art will be briefly described below. Obviously, the accompanying drawings in the following description are only some embodiments of this application, and for a person of ordinary skill in the art, without involving any inventive effort, other accompanying drawings may also be obtained according to these accompanying drawings.

FIG. 1 is a schematic structural diagram of a multi-level converter according to an embodiment of this application;

FIG. 2 is a schematic diagram of an implementation flow of a multi-level converter control method according to an embodiment of this application;

DETAILED DESCRIPTION OF ILLUSTRATIVE EMBODIMENTS

Figure 3:
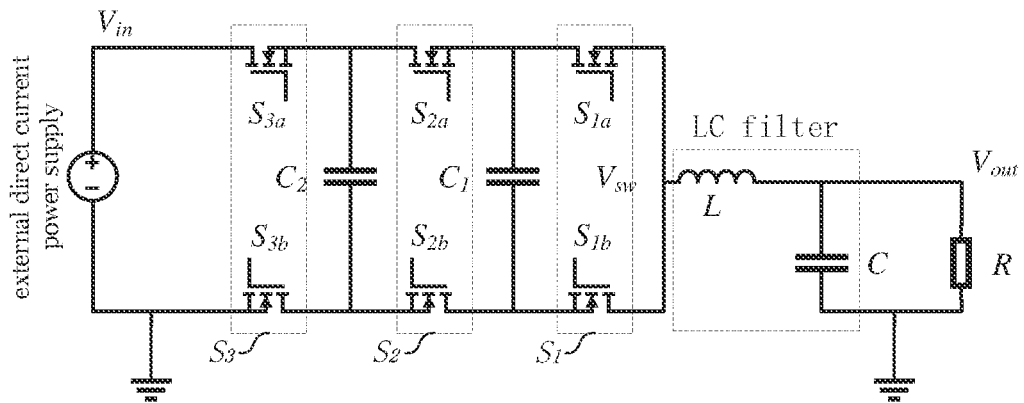
FIG. 3 is a schematic structural diagram of a four-level converter according to an embodiment of this application.

In the following description, for purposes of explanation and not limitation, specific details are set forth such as particular system architectures and techniques in order to provide a thorough understanding of the embodiments of this application. However, it will be apparent to a person skilled in the art that this application may be practiced in other embodiments that depart from these specific details. In other cases, detailed descriptions of well-known systems, devices, circuits, and methods are omitted so as not to obscure the description of this application with unnecessary detail.

In order to illustrate the technical solution described in this application, the following description is made by means of specific embodiments.

An embodiment of this application provides a multi-level converter control method. The method is applied to a multi-level converter. As shown in FIG. 1, the multi-level converter includes at least two switch tube groups $S_1$-$S_N$ (N≥2) connected in series, a flying capacitor $C_1$-$C_{N-1}$ connected in parallel between two adjacent switch tube groups, and an LC filter. Each switch tube group $S_n$ includes a first switch tube $S_{na}$ and a second switch tube $S_{nb}$. A first end after series connection of the first switch tubes $S_{1a}$-$S_{Na}$ of the at least two switch tube groups is connected to a positive electrode of an external power supply. A first end after series connection of the second switch tubes $S_{1b}$-$S_{Nb}$ of the at least two switch tube groups is connected to a negative electrode of the external power supply. A second end after series connection of the first switch tubes $S_{1a}$-$S_{Na}$ of the at least two switch tube groups and a second end after series connection of the second switch tubes $S_{1b}$-$S_{Nb}$ of the at least two switch tube groups are both connected to an input end of the LC filter. An output end of the LC filter is configured to be externally connected to a load R. For any one of flying capacitors, such as $C_1$, connected in parallel between two adjacent switch tube groups, a series connection point formed by the first switch tube $S_{1a}$ of the first switch tube group $S_1$ connected in series with the first switch tube $S_{2a}$ of the second switch tube group $S_2$ is connected to a first end of the flying capacitor $C_1$, and a series connection point formed by the second switch tube $S_{1b}$ of the first switch tube group $S_1$ connected in series with the second switch tube $S_{2b}$ of the second switch tube group $S_2$ is connected to a second end of the flying capacitor $C_1$.

With reference to FIG. 2, the multi-level converter control method provided by the embodiment of this application specifically includes the following steps.

In step S101, an inductive current of the LC filter within a drive pulse cycle is collected.

In the embodiment of this application, an inductive current of the LC filter within one drive pulse cycle may be collected by using a current sensor. If the solution of a series resistor is adopted, a current sampling resistor is $R_{sense}$, a gain of a sampling chip is $A_V$, and a voltage measured by an analog-to-digital conversion module of a controller is $V_{ADC}$, an inductive current $I_L$ may be obtained as:

$$I_L = V_{ADC} / (R_{sense} * A_V)$$

In step S102, a first switch tube to be adjusted and a duty cycle adjustment amount of the first switch tube to be adjusted are determined based on a slope of a rising period of the inductive current, and a duty cycle of the first switch tube to be adjusted is adjusted based on the duty cycle adjustment amount of the first switch tube to be adjusted.

Optionally, as a specific embodiment of the multi-level converter control method provided by the embodiment of this application, the step that a first switch tube to be adjusted and a duty cycle adjustment amount of the first switch tube to be adjusted are determined based on a slope of a rising period of the inductive current includes the following operations:

Slopes of various rising periods of the inductive current and an average value of the slopes of the various rising periods of the inductive current are calculated.

A difference value between the slope of each rising period and the average value is respectively calculated, and a maximum difference value is determined.

A first switch tube to be adjusted and a duty cycle adjustment amount of the first switch tube to be adjusted are determined based on the maximum difference value.

Optionally, as a specific embodiment of the multi-level converter control method provided by the embodiment of this application, the step that a first switch tube to be adjusted is determined based on the maximum difference value includes the following operations:

A rising period corresponding to the maximum difference value is determined.

A first switch tube to be adjusted is determined according to a position of the rising period corresponding to the maximum difference value within the drive pulse cycle.

Optionally, as a specific embodiment of the multi-level converter control method provided by the embodiment of this application, the step that a duty cycle adjustment amount of the first switch tube to be adjusted is determined based on the maximum difference value includes the following operations:

The maximum difference value is input into a preset proportional-integral controller to obtain a duty cycle adjustment amount of the first switch tube to be adjusted.

In the embodiment of this application, if the sum of charges charged into the flying capacitor and charges discharged from the flying capacitor within one drive pulse cycle is zero, i.e. the integral of current flowing through the flying capacitor is zero, the voltage across the flying capacitor remains unchanged. In a phase-shifted PWM control mode, at any time within one drive pulse cycle, a node voltage Vsw of the switch tube always corresponds to the voltage of a certain flying capacitor or the sum of voltage of certain two flying capacitors, and an output voltage remains basically unchanged. Therefore, the voltage across an inductor L of the LC filter can reflect the voltage condition of the flying capacitor, and the voltage across the inductor L is reflected in the change rate of the inductive current, i.e. the slope of the inductive current IL. Therefore, the voltage of the flying capacitor may be controlled to achieve balance by controlling the slope of the inductive current.

In the embodiment of this application, when the voltage of each flying capacitor is balanced, the slopes of the various rising periods of the inductive current should be the same, and the slopes of the various falling periods should also be the same. When there is a difference in the slope of a certain period, it indicates that the voltage of the flying capacitor corresponding to the period is no longer balanced. By adjusting the duty ratio of the switch tube corresponding to the period, the unbalanced voltage of the flying capacitor may be adjusted.

In step S103, a second switch tube to be adjusted and a duty cycle adjustment amount of the second switch tube to be adjusted are determined based on a slope of a falling period of the inductive current, and a duty cycle of the second switch tube to be adjusted is adjusted based on the duty cycle adjustment amount of the second switch tube to be adjusted.

In the embodiment of this application, the process of adjusting the second switch tube is similar to step S102. That is, slopes of various falling periods of the inductive current and an average value of the slopes of the various falling periods of the inductive current are calculated. A difference value between the slope of each falling period and the average value is respectively calculated, and a maximum difference value is determined. A second switch tube to be adjusted and a duty cycle adjustment amount of the second switch tube to be adjusted are determined based on the maximum difference value. A duty cycle of the second switch tube to be adjusted is adjusted based on the duty cycle adjustment amount of the second switch tube to be adjusted. The specific implementation process may refer to step S102 described above.

Optionally, as a specific embodiment of the multi-level converter control method provided by the embodiment of this application, before step S101, the method further includes the following step:

In step S1001, a duty ratio of a drive pulse of each first switch tube $S_{1a}$-$S_{Na}$ is set based on a preset input voltage and a preset output voltage of the multi-level converter.

Optionally, as a specific embodiment of the multi-level converter control method provided by the embodiment of this application, if a reference ground of the multi-level converter is the negative electrode of the external power supply, the step that a duty ratio of a drive pulse of each first switch tube $S_{1a}$-$S_{Na}$ is set based on a preset input voltage and a preset output voltage of the multi-level converter includes the following:

$$D = V_{out} / V_{in}$$

where D is the duty ratio of the drive pulse, $V_{in}$ is the preset input voltage, and $V_{out}$ is the preset output voltage.

Optionally, as a specific embodiment of the multi-level converter control method provided by the embodiment of this application, if a reference ground of the multi-level converter is an intermediate point of the external power supply, the step that a duty ratio of a drive pulse of each first switch tube $S_{1a}$-$S_{Na}$ is set based on a preset input voltage and a preset output voltage of the multi-level converter includes the following:

$$D = V_{out}/V_{in} + 0.5$$

where D is the duty ratio of the drive pulse, $V_{in}$ is the preset input voltage, and $V_{out}$ is the preset output voltage.

In the embodiment of this application, a duty ratio of a drive pulse of each first switch tube $S_{1a}$-$S_{Na}$ is set according to a preset input voltage and a preset output voltage of the multi-level converter, so that the multi-level converter is in an ideal operating state irrespective of a bias voltage. In addition, with reference to FIG. 1, if a reference ground of the multi-level converter is an intermediate point of the external power supply, it is necessary to connect two capacitors $C_{i1}$ and $C_{i2}$ connected in series in parallel across the external power supply to obtain an intermediate point of the input voltage.

Optionally, as a specific embodiment of the multi-level converter control method provided by the embodiment of this application, before step S101, the method further includes the following step.

In step S1002, for the various first switch tubes $S_{1a}$-$S_{Na}$ connected in series, phases of the drive pulses of the various first switch tubes $S_{1a}$-$S_{Na}$ connected in series are sequentially set at a delay interval of 360°/N from the input end of the LC filter to the positive electrode of the external power supply, where N is the number of switch tube groups.

Optionally, as a specific embodiment of the multi-level converter control method provided by the embodiment of this application, before step S101, the method further includes the following step:

In step S10003, for any switch tube group $S_i$, the drive pulse of the first switch tube $S_{ia}$ and the drive pulse of the second switch tube $S_{ib}$ are set to be complementary, and a dead time of the drive pulse of the first switch tube $S_{ia}$ and the drive pulse of the second switch tube $S_{ib}$ is set.

In the embodiment of this application, for any switch tube group $S_i$, the first switch tube $S_{ia}$ and the second switch tube $S_{ib}$ are always in complementary conduction, and a dead time is set between the first switch tube $S_{ia}$ and the second switch tube $S_{ib}$ which are in complementary conduction. Within the dead time, the first switch tube $S_{ia}$ and the second switch tube $S_{ib}$ which are in complementary conduction are both in an off state, it can be avoided that the first switch tube $S_{ia}$ and the second switch tube $S_{ib}$ which are in complementary conduction may be conducted simultaneously at the moment of state change, resulting in a short circuit of the flying capacitor.

Illustratively, the multi-level converter control method provided by the embodiment of this application will be described below by means of a direct current-direct current converted four-level converter.

With reference to FIG. 3, the four-level converter has three switch tube groups $S_1$, $S_2$, and $S_3$, and specific parameters of the four-level converter are shown in Table 1.

TABLE 1

| Parameters of Four-Level Converter | | | |
|---|---|---|---|
| $V_{in}$ | 48 V | $V_{out}$ | 12 V |

TABLE 1-continued

| Parameters of Four-Level Converter | | | |
|---|---|---|---|
| $C_1$, $C_2$ | 2.2 μF | L | 50 μH |
| C | 100 μF | $f_s$ | 100 kHz |

Drive pulses of the first switch tubes $S_{1a}$, $S_{2a}$ and $S_{3a}$ and the second switch tubes $S_{1b}$, $S_{2b}$ and $S_{3b}$ of the four-level converter are firstly set, including:

(1) A duty ratio of the drive pulses of the first switch tubes $S_{1a}$, $S_{2a}$ and $S_{3a}$ is set.

Since a reference ground of the four-level converter is a negative electrode of an external direct current power supply, the duty ratio of the drive pulse is calculated to be 0.25 according to a formula $D=V_{out}/V_{in}$.

(2) A phase relationship of the drive pulses of the first switch tubes $S_{1a}$, $S_{2a}$ and $S_{3a}$ is set such that $S_{2a}$ lags $S_{1a}$ by 120° and $S_{3a}$ lags $S_{2a}$ by 120°.

(3) The drive pulse of Sib is set to be complementary to $S_{1a}$, the drive pulse of $S_{2a}$ is set to be complementary to $S_{2a}$, the drive pulse of $S_{3b}$ is set to be complementary to $S_{3a}$, and a certain dead time is reserved. Since the drive pulses of $S_{1a}$, $S_{2a}$ and $S_{3a}$ are determined, the drive pulses of $S_{1b}$, $S_{2b}$ and $S_{3b}$ can also be determined.

Figure 4:
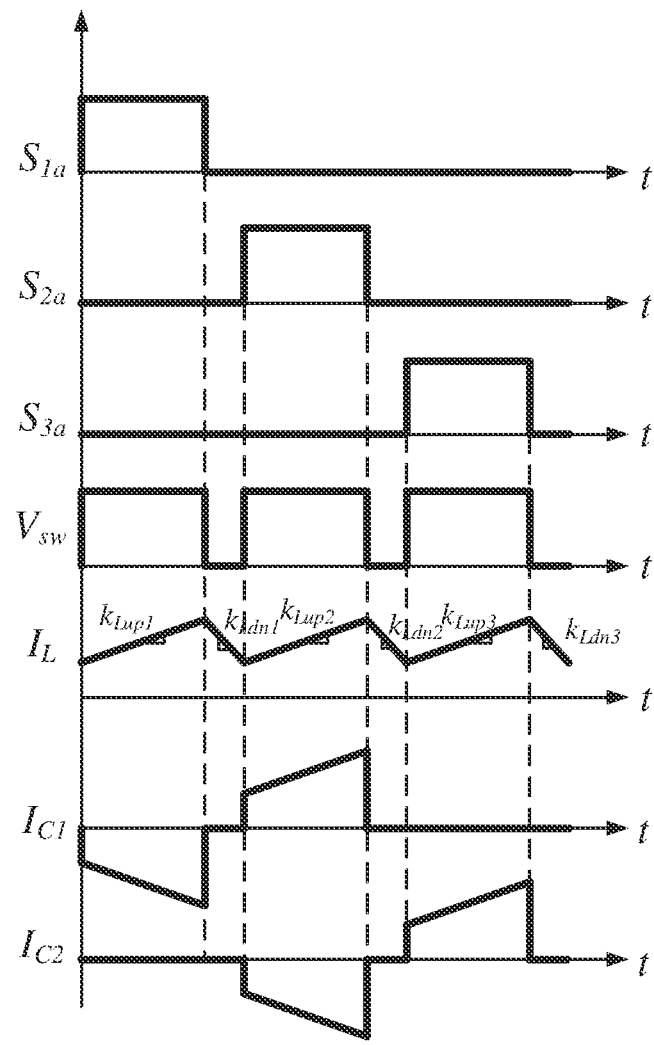
FIG. 4 is a schematic diagram of a drive pulse and a key parameter waveform for a four-level converter under ideal operating conditions according to an embodiment of this application.

When the four-level converter operates in an ideal state, the drive pulses of the first switch tubes $S_{1a}$, $S_{2a}$ and $S_{3a}$ and key parameter waveforms in the four-level converter are as shown in FIG. 4. It can be seen that when the voltages of the flying capacitors $C_1$ and $C_2$ are balanced, i.e. the amount of charges charged by $I_{C1}$ into the flying capacitor $C_1$ is equal to the amount of charges discharged from the flying capacitor $C_1$, and the amount of charges charged by $I_{C2}$ into the flying capacitor $C_2$ is equal to the amount of charges discharged from the flying capacitor $C_2$, the node voltages $V_{sw}$ of the various switch tubes are the same. That is, the voltages of the flying capacitor $C_1$ and the flying capacitor $C_2$ are balanced. Accordingly, slopes $k_{Lup1}$, $k_{Lup2}$ and $k_{Lup3}$ of various rising periods of the inductive current $I_L$ are the same, and slopes $k_{Ldn1}$, $k_{Ldn2}$ and $k_{Ldn3}$ of various falling periods are the same. However, in practical applications, since an input power supply is not an ideal voltage source and the delay of a gate drive signal is not consistent, the charges of the flying capacitor $C_1$ and the flying capacitor $C_2$ cannot be completely consistent, resulting in a difference in the slope of the inductive current $I_L$.

For the four-level converter provided by the embodiment of this application, since the voltages across the inductor are both output voltages during the falling period of the inductive current and the output voltages are considered to remain unchanged, the falling slopes of the inductive current are always the same, and therefore only the slope of the rising period needs to be controlled.

Figure 5:
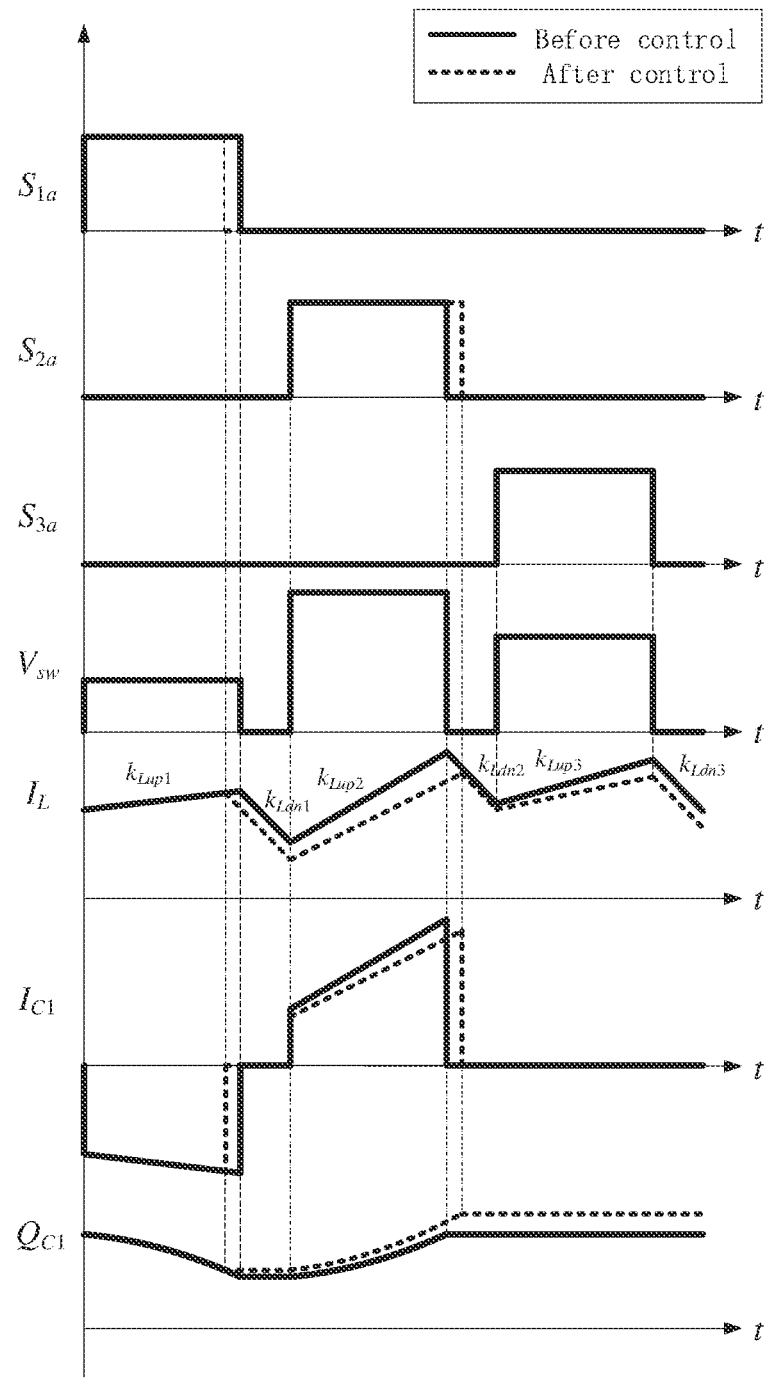
FIG. 5 is a schematic diagram of a drive pulse and a key parameter waveform before and after control of a four-level converter within one drive pulse cycle according to an embodiment of this application.

With reference to FIG. 5, an inductive current of the LC filter of the four-level converter within one drive pulse cycle is collected, slopes $k_{Lup1}$, $k_{Lup2}$ and $k_{Lup3}$ of each rising period of the inductive current and an average value of $k_{Lup1}$, $k_{Lup2}$ and $k_{Lup3}$ are calculated, difference values between $k_{Lup1}$, $k_{Lup2}$ and $k_{Lup3}$ and the average value are respectively calculated, and a maximum difference value is determined. It is found that the slope $k_{Lup2}$ has a large difference. Therefore, the maximum difference value is input into a preset proportional-integral controller to obtain a duty cycle adjustment amount, and a duty cycle of the first switch tube $S_{2a}$ corresponding to the slope $k_{Lup2}$ is adjusted according to the duty cycle adjustment amount. In the present embodiment, in order to improve the control efficiency, the duty cycle of $S_{1a}$ and $S_{2a}$ are simultaneously adjusted based on the duty cycle adjustment amount, i.e. the duty cycle of $S_{1a}$ is reduced and the duty cycle of $S_{2a}$ is increased, and in practice, only the duty ratio of $S_{2a}$ may be adjusted.

Figure 6:
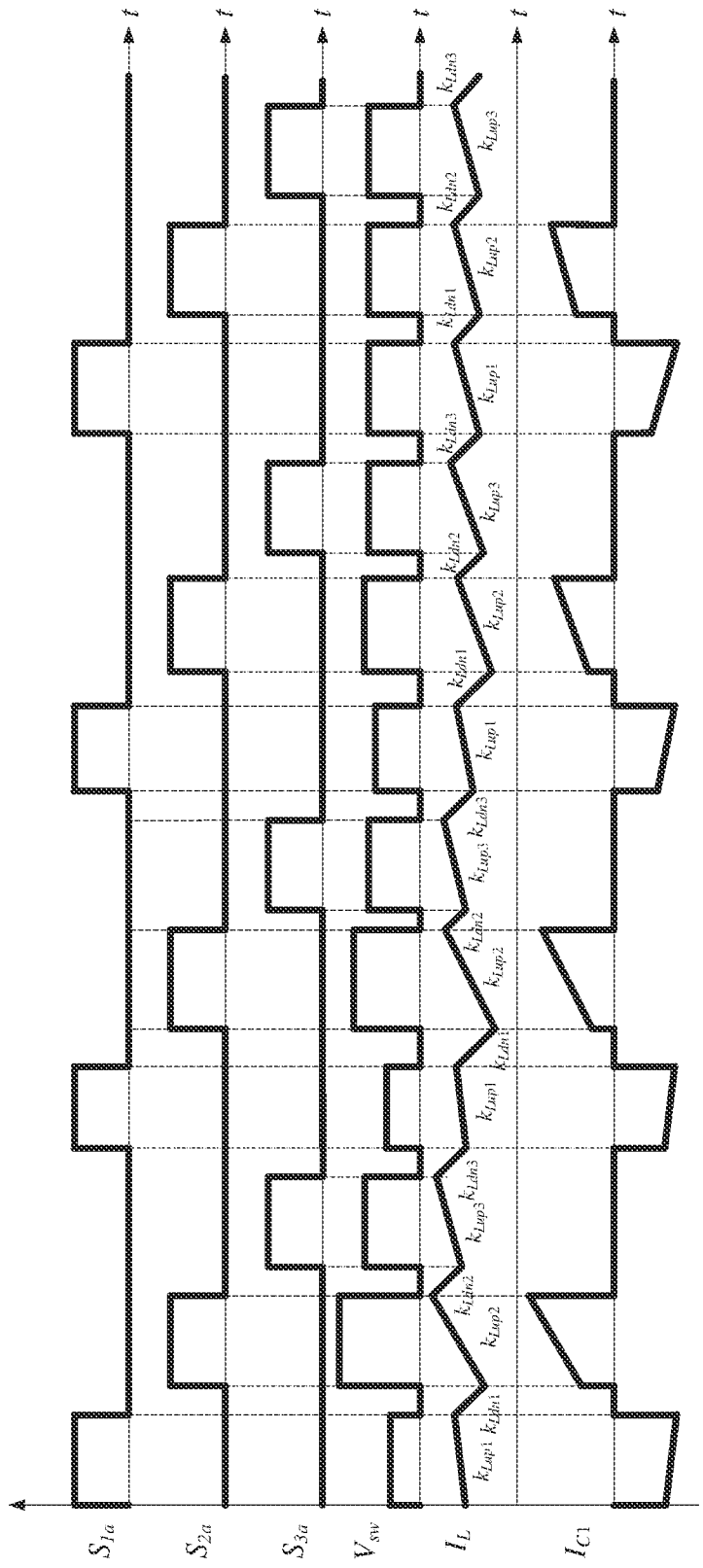
FIG. 6 is a schematic diagram of a drive pulse and a key parameter waveform for controlling a four-level converter within multiple drive pulse cycles according to an embodiment of this application.

It can be seen from FIG. 5 that within one drive pulse cycle, by reducing the duty ratio of the drive pulse of $S_{1a}$ and increasing the duty ratio of the drive pulse of $S_{2a}$, the amount of charges $Q_{C1}$ of the flying capacitor $C_1$ is increased, and accordingly, the difference between the slope $k_{Lup2}$ and the slopes $k_{Lup1}$ and $k_{Lup3}$ is also smaller. As shown in FIG. 6, the slopes $k_{Lup1}$, $k_{Lup2}$ and $k_{Lup3}$ of various rising periods gradually tend to be equal through the adjustment of multiple drive pulse cycles, and finally the flying capacitor with voltage deviation is corrected to a theoretical steady-state value.

It should be noted that the above only shows a control process of the direct current-direct current converted four-level converter. A direct current-direct current converted multi-level converter or an alternating current-direct current converted multi-level converter may also be controlled by the multi-level converter control method provided by the embodiment of this application, and the control process is similar to the control process of the above-mentioned embodiments, and will not be elaborated herein.

It can be seen from the above content that according to the multi-level converter control method provided by the embodiment of this application, a switch tube to be adjusted and a duty cycle adjustment amount of the switch tube are determined according to slopes of a rising period and a falling period of an inductive current by collecting the inductive current of an LC filter within one drive pulse cycle, and a duty cycle of the switch tube to be adjusted is adjusted according to the duty cycle adjustment amount, thereby changing a voltage of a flying capacitor connected to the switch tube, and finally balancing the voltage of each flying capacitor of the multi-level converter. According to this application, it is only necessary to collect the inductive current of the LC filter to control the voltage of each flying capacitor of the multi-level converter to be balanced, and the implementation method is simple and is not affected by the number of levels of the multi-level converter.

It should be understood that the size of a sequence number of each step in the above-described embodiments does not imply the order of execution, and that the order of execution of each process should be determined by its function and inherent logic and should not constitute any limitation on the implementation process of the embodiments of this application.

The above-described embodiments are merely illustrative of the technical solutions of this application and are not intended to be limiting thereof. Although this application has been described in detail with reference to the foregoing embodiments, those of ordinary skill in the art should understand that the technical solutions described in the foregoing embodiments are modified, or some technical features therein are equivalently replaced, but the modifications and replacements do not make the essence of the corresponding technical solutions depart from the spirit and scope of the technical solutions of various embodiments of this application, and are all included within the scope of protection of this application.

What is claimed is:

1. A multi-level converter control method applied to a multi-level converter,
   the multi-level converter comprising:
   at least two switch tube groups connected in series between an external power supply and a LC filter, wherein each switch tube group of the at least two switch tube groups comprises a first switch tube and a second switch tube, first switch tubes of the at least two switch tube groups connected in series forming a first series part, and second switch tubes of the at least two switch tube groups connected in series forming a second series part, and wherein a first end of the first series part is connected to a positive electrode of the external power supply, and a first end of the second series part is connected to a negative electrode of the external power supply;
   a flying capacitor connected between two adjacent switch tube groups of the at least two switch tube groups, wherein a first end of the flying capacitor is connected to a common node of respective first switch tubes of the two adjacent switch tube groups, and a second end of the flying capacitor is connected to a common node of respective second switch tubes of the two adjacent switch tube groups; and
   the LC filter, wherein an input end of the LC filter is connected to a second end of the first series part and a second end of the second series part, and an output end of the LC filter is configured to be externally connected to a load; and
   the multi-level converter control method comprising:
   collecting an inductive current of the LC filter within a drive pulse cycle;
   determining a to-be-adjusted first switch tube from first switch tubes of the at least two switch tube groups and a duty cycle adjustment amount of the to-be-adjusted first switch tube based on slopes of rising periods of the inductive current, and adjusting a duty cycle of the to-be-adjusted first switch tube based on the duty cycle adjustment amount of the to-be-adjusted first switch tube; and
   determining a to-be-adjusted second switch tube from second switch tubes of the at least two switch tube groups and a duty cycle adjustment amount of the to-be-adjusted second switch tube based on slopes of falling periods of the inductive current, and adjusting a duty cycle of the to-be-adjusted second switch tube based on the duty cycle adjustment amount of the to-be-adjusted second switch tube.

2. The control method according to claim 1, wherein the determining the to-be-adjusted first switch tube and the duty cycle adjustment amount of the to-be-adjusted first switch tube comprises:
   calculating the slopes of the rising periods of the inductive current and an average value of the slopes of the rising periods of the inductive current;
   respectively calculating a difference value between a slope of each of the rising periods and the average value, and based thereon determining a maximum difference value; and
   determining the to-be-adjusted first switch tube and the duty cycle adjustment amount of the to-be-adjusted first switch tube based on the maximum difference value.

3. The control method according to claim 2, wherein the determining the to-be-adjusted first switch tube based on the maximum difference value comprises:
   determining a rising period corresponding to the maximum difference value; and
   determining the to-be-adjusted first switch tube according to a position of the rising period corresponding to the maximum difference value within the drive pulse cycle.

4. The control method according to claim 2, wherein the determining the duty cycle adjustment amount of the to-be-adjusted first switch tube based on the maximum difference value comprises:

inputting the maximum difference value into a preset proportional-integral controller to obtain the duty cycle adjustment amount of the to-be-adjusted first switch tube.

5. The control method according to claim 1, before the collecting the inductive current of the LC filter within the drive pulse cycle, further comprising:

setting a duty ratio of a drive pulse of each first switch tube based on a preset input voltage and a preset output voltage of the multi-level converter.

6. The control method according to claim 5, wherein when a reference ground of the multi-level converter is the negative electrode of the external power supply, the duty ratio of the drive pulse of each first switch tube is set as:

$$D = V_{out}/V_{in},$$

where D is the duty ratio of the drive pulse, $V_{in}$ is the preset input voltage, and $V_{out}$ is the preset output voltage.

7. The control method according to claim 5, wherein when a reference ground of the multi-level converter is an intermediate point of the external power supply, the duty ratio of the drive pulse of each first switch tube is set as:

$$D = V_{out}/V_{in} + 0.5,$$

where D is the duty ratio of the drive pulse, $V_{in}$ is the preset input voltage, and $V_{out}$ is the preset output voltage.

8. The control method according to claim 1, before the collecting the inductive current of the LC filter within the drive pulse cycle, further comprising:

sequentially setting, for the first switch tubes of the at least two switch tube groups connected in series, phases of drive pulses of the first switch tubes connected in series at a delay interval of 360°/N from the input end of the LC filter to the positive electrode of the external power supply, wherein N is the number of the at least two switch tube groups.

9. The control method according to claim 1, before the collecting the inductive current of the LC filter within the drive pulse cycle, further comprising:

setting, for any one of the at least two switch tube groups, a drive pulse of the first switch tube and a drive pulse of the second switch tube to be complementary to each other.

10. The control method according to claim 9, before the collecting the inductive current of the LC filter within the drive pulse cycle, further comprising:

setting, for any one of the at least two switch tube groups, a dead time of the drive pulse of the first switch tube and the drive pulse of the second switch tube.

* * * * *